Oct. 27, 1942.    O. R. BRINEY, JR    2,299,961
SUPPORTING STRUCTURE FOR FEED SCREW NUTS
Filed May 21, 1942
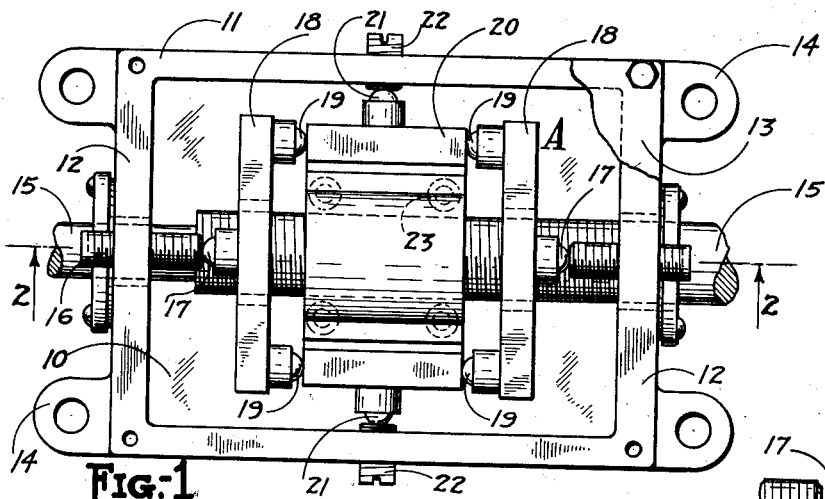
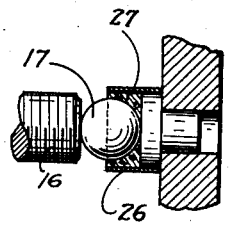
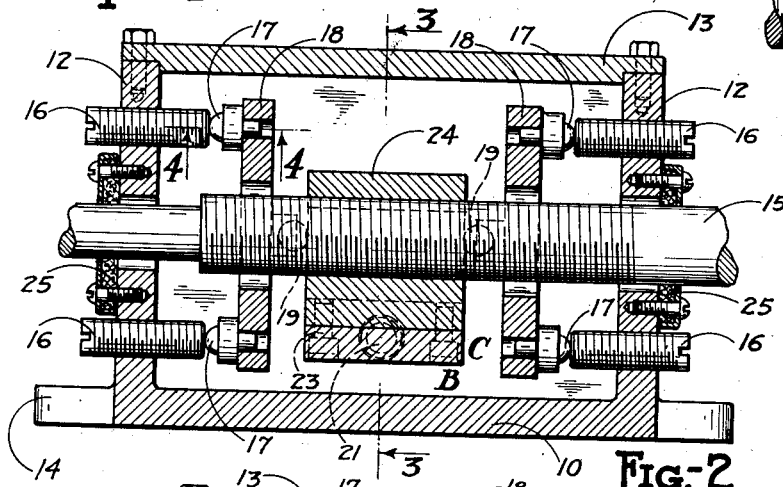
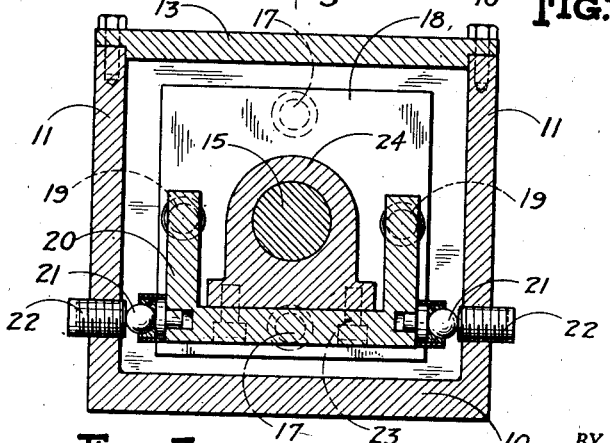
INVENTOR.
OTTIS R. BRINEY, JR.
BY Richey & Watts
ATTORNEYS.

Patented Oct. 27, 1942

2,299,961

UNITED STATES PATENT OFFICE 2,299,961

SUPPORTING STRUCTURE FOR FEED SCREW NUTS

Ottis R. Briney, Jr., Pontiac, Mich.

Application May 21, 1942, Serial No. 443,872

8 Claims. (Cl. 74—441)

This invention relates broadly to lead screw for machine tools and more specifically to improvements in the driving connection between the traveler nut and machine element coupled therewith.

The primary object of the invention is to provide a drive coupling for a traveler nut which is designed to minimize wear of the screw threads without restriction to the operation thereof or sacrifice of precision.

Another object of the invention is to provide a supporting structure for a lead screw traveler which will facilitate free oscillatory movement of the nut upon the screw in planes normal and divergent to the axis of the screw.

Another object of the invention is to provide a bearing member for a traveler nut mounting which is designed to minimize frictional resistance between the movable parts of the assembly and in addition afford adjustments for the purpose of alignment or compensation of wear.

Other objects and advantages more or less ancillary to the foregoing and the manner in which all the various objects are realized will appear in the following description, which considered in connection with the accompanying drawing, sets forth the preferred embodiment of the invention.

Referring to the drawing:

Fig. 1 is a plan view of the improved nut supporting structure including a fragmentary portion of the feed screw coordinated therewith, the lid or cover plate for the housing being removed in the interest of clarity;

Fig. 2 is a vertical section through the nut supporting structure illustrated in Fig. 1, the section being taken on the plane indicated by the line 2—2 in Fig. 1;

Fig. 3 is a transverse sectional view of the nut supporting structure, the section being taken on a plane indicated by the line 3—3 in Fig. 2; and Fig. 4 is an enlarged detail view of one of the bearing members, the view being shown as taken on a plane indicated by the line 4—4 in Fig. 1.

As illustrated in Fig. 1, the supporting structure comprises a rectangular frame or housing 10 embodying side walls 11, end walls 12 and a cover plate 13. The housing is formed with lugs 14 apertured for the reception of bolts for the adfixture of the supporting structure upon the bed of the machine or part reciprocated by the traveler nut. The end walls 12 of the housing are bored for the reception of the lead screw 15 which constitutes a part of the machine with which the improved nut supporting structure is associated. Each end wall of the housing is drilled and tapped to receive a pair of screws 16 having the inner ends thereof ground square with the axis thereof for engagement with balls or thrust bearings 17. The screws 16 are disposed in a vertical plane passing through the axis of the feed screw 15, the balls 17 being impinged between the screws and square ground faces of buttons seated in plates 18. The opposed faces of the plates are provided with similar buttons which are engaged by balls 19 impinged between the vertical end walls of a saddle 20. The balls 19 are disposed in a horizontal plane passing through the axis of the screw 15. The saddle is further supported by balls 21 engaged with the ends of a pair of aligned screws 22 mounted in the side walls 11 of the housing 10 below the center line of the screw 15. The balls 21 are impinged between the ends of the screws 22 and the faces of buttons seated in the saddle 20. The base of the saddle is drilled for the reception of cap screws 23 which support an internally threaded block or traveler nut 24 engaged with the feed screw 15. The openings in the end walls of the housing 10 are preferably provided with felt washers 25 mounted to preclude the admission of dirt and retain a lubricant within the chamber defined by the walls of the housing.

For purpose of assembly the ball thrust buttons are provided with sleeves or ferrules 26, preferably pressed thereon, which are partially filled with cork, felt or other pliable material capable of supporting the balls until the screws 16 and 22 are adjusted into impinging engagement with the balls.

In operation as the shaft 15 is rotated axial movement of the supporting structure is effected through the nut 24, the balls 19, plates 18, balls 17 and the screws 16 which are mounted in the housing 10. Wobbling of the nut initiated by deflection or eccentricity of the screw 15 is realized by the movements afforded the saddle as the balls 21 roll between the parallel faces of the buttons and screws 22. Further movement is afforded the saddle as the plates 18 oscillate upon the balls 19 and 17 in the horizontal and vertical planes common to the medial axis of the screw.

More specifically, the nut is free to float with the screw 15 since the ball fulcrums 17 in the vertical plane passing through the axis of the screw 15 permit the plates 18 to rock towards and away from the point A, indicated in Fig. 1, since the ball fulcrums 19 in the horizontal plane passing through the axis of the screw 15 permit the saddle to rock towards and away from the point B, indicated in Fig. 2, and since the ball fulcrums 21 subjacent the axis of the screw 15 permit the saddle 24 to rock towards and away from the point C indicated in Fig. 2.

When the screws 16 are suitably adjusted the plates 12 are sustained in position by the pressure exerted by the screws through the balls 17 and 19, a support which is free from lost motion, vibratory reactions, and frictional loss.

Although the foregoing description is directed to a movable nut and rotatable, axially immovable screw it will be understood that all of the advantages and utilities of the invention may be realized when used in a structure in which the nut is fixed and the screw mounted for rotative axial movement.

I claim:

1. In combination with a lead screw and traveler nut, a driving connection for the nut and part moved thereby comprising a housing having an opening therein for the reception of the lead screw, a pair of thrust members therein, pivotal supports therefor disposed in a plane common to the medial axis of the lead screw, a drive member connected with the traveler nut, pivotal supports therefor intermediate said thrust members and said drive member, said pivotal supports being disposed in a plane common to the medial axis of the screw and normal to the plane of the first named pivotal supports and thrust bearings for said drive member supported in said housing subjacent the medial axis of the screw.

2. In combination with a lead screw and traveler nut, a supporting structure for the transmission of axial movements of the nut on the screw comprising a housing having an opening therein for the reception of the lead screw, a pair of plates therein having openings therein for the reception of the lead screw, screws in said housing disposed in a vertical plane common to the medial axis of the screw, ball impinged between said screws and said plates, a saddle affixed to the traveler nut, balls disposed in a horizontal plane common to the medial axis of the screw and impinged between said plates and said saddle, screws in said housing disposed below the axis of the lead screw and at right angles to the first named screws and balls impinged between the last named screws and said saddle.

3. In combination with a rotatively driven screw, a traveler nut mounting thereof comprising a housing having openings therein for the reception of the screw, a pair of plates in said housing having openings therein for the reception of the screw, balls disposed in a vertical plane common to the medial axis of the screw impinged between the plates and the housing, a saddle intermediate said plates, balls disposed in a horizontal plane common to the medial axis of the screw impinged between said saddle and said plates and balls disposed below the medial axis of the screw impinged between said housing and said saddle.

4. A nut supporting structure for a lead screw traveler nut comprising a frame, screws therein, plates disposed in parallel spaced relation, balls impinged between said screws and said plates, a traveler nut saddle intermediate said plates, balls impinged between said plates and said saddle and constituting in conjunction with the first named balls the support therefor, screws in said frame disposed at right angles to the first named screws and balls impinged between said saddle and the last named screws.

5. A traveler nut supporting structure for a lead screw comprising a housing, members therein mounted for pivotal movement in vertical and horizontal planes common to the medial axis of the screw, a second member intermediate the first named members supported by the lead screw and thrust bearings engaged with said second member disposed in spaced relation to the medial axis of the lead screw and normal thereto.

6. In combination with a lead screw and nut, a mounting for said nut comprising a frame, a pair of plates supported thereby and mounted for pivotal movement in planes common to the axis of the screw and a saddle intermediate said plates mounted for pivotal movement relative to said plates and said frame.

7. A lead screw nut supporting structure comprising a housing, adjustable ball fulcrums therein, plates disposed in spaced parallel relation and engaged with said fulcrums, a nut supporting saddle intermediate said plates, ball fulcrums intermediate said saddle and said plates and adjustable ball fulcrums in said housing, disposed at right angles to the first named ball fulcrum and engaged with said saddle.

8. In combination with a lead screw and nut, a supporting structure therefor comprising a housing, a pair of plates disposed transaxial the screw and mounted for pivotal movement about the medial axis of the screw, abutments in said housing disposed transaxial the screw and in spaced relation to the medial axis thereof and a member affixed to the nut and pivotally engaged with said plates and said abutments, said member being restrained from rotation about the screw by said abutments.

OTTIS R. BRINEY, Jr.